US00RE39307E

(19) United States
(12) Reissued Patent
Zhou

(10) Patent Number: US RE39,307 E
(45) **Date of Reissued Patent: *Sep. 26, 2006**

(54) HOT-MELT ADHESIVE HAVING IMPROVED BONDING STRENGTH

(75) Inventor: Peiguang Zhou, Appleton, WI (US)

(73) Assignee: Kimberly-Clark Worldwide, Inc., Neenah, WI (US)

( * ) Notice: This patent is subject to a terminal disclaimer.

(21) Appl. No.: 10/997,557

(22) Filed: Nov. 24, 2004

Related U.S. Patent Documents

Reissue of:
(64) Patent No.: 6,657,009
Issued: Dec. 2, 2003
Appl. No.: 09/945,240
Filed: Aug. 31, 2001

U.S. Applications:
(60) Provisional application No. 60/259,037, filed on Dec. 29, 2000.

(51) Int. Cl.

| | |
|---|---|
| ***C09J 123/00*** | (2006.01) |
| ***C09J 123/02*** | (2006.01) |
| ***B32B 27/32*** | (2006.01) |
| ***C08F 8/00*** | (2006.01) |
| ***C08L 23/00*** | (2006.01) |
| ***C08L 23/04*** | (2006.01) |

(52) U.S. Cl. ..... 525/191; 525/240
(58) Field of Classification Search ..... 525/191, 525/240
See application file for complete search history.

(56) References Cited

U.S. PATENT DOCUMENTS

| | | | | | |
|---|---|---|---|---|---|
| 3,325,562 | A | * | 6/1967 | Peterkin | 525/155 |
| 3,338,992 | A | * | 8/1967 | Kinney | |
| 3,341,394 | A | * | 9/1967 | Kinney | |
| 3,370,106 | A | * | 2/1968 | Hall, Jr. et al. | |
| 3,492,372 | A | * | 1/1970 | Flanagan | |
| 3,502,538 | A | * | 3/1970 | Petersen | |
| 3,502,763 | A | * | 3/1970 | Hartmann | |
| 3,542,615 | A | * | 11/1970 | Dobo et al. | |
| 3,634,546 | A | * | 1/1972 | Hagemeyer | |
| 3,635,861 | A | * | 1/1972 | Russell | |
| 3,686,107 | A | * | 8/1972 | Russell | |
| 3,692,618 | A | * | 9/1972 | Dorschner et al. | |
| 3,717,601 | A | * | 2/1973 | Jurrens | |
| 3,802,817 | A | * | 4/1974 | Matsuki et al. | |
| 3,849,241 | A | * | 11/1974 | Butin et al. | |
| 3,850,858 | A | * | 11/1974 | Park | |
| 3,862,068 | A | * | 1/1975 | Russell | |
| 3,887,442 | A | * | 6/1975 | Gilchrist | |
| 3,900,694 | A | * | 8/1975 | Jurrens | |
| 3,982,051 | A | * | 9/1976 | Taft et al. | |
| 4,013,816 | A | * | 3/1977 | Sabee et al. | |
| 4,022,728 | A | * | 5/1977 | Trotter et al. | |
| 4,041,203 | A | * | 8/1977 | Brock et al. | |
| 4,072,735 | A | * | 2/1978 | Ardemagni | |
| 4,112,208 | A | * | 9/1978 | McConnell et al. | |
| 4,120,916 | A | * | 10/1978 | Meyer, Jr. et al. | 520/240 |
| 4,143,858 | A | * | 3/1979 | Schmidt, III et al. | |
| 4,178,272 | A | * | 12/1979 | Meyer, Jr. et al. | |
| 4,186,258 | A | * | 1/1980 | Schmidt, III et al. | |
| 4,221,696 | A | * | 9/1980 | Cook et al. | |
| 4,259,220 | A | * | 3/1981 | Bunnelle et al. | |
| 4,296,750 | A | * | 10/1981 | Woon et al. | |
| 4,300,967 | A | | 11/1981 | Sigl | |
| 4,340,563 | A | * | 7/1982 | Appel et al. | |
| 4,366,292 | A | * | 12/1982 | Werner et al. | |
| 4,437,860 | A | | 3/1984 | Sigl et al. | |
| 4,460,728 | A | * | 7/1984 | Schmidt, Jr. et al. | |
| 4,486,192 | A | | 12/1984 | Sigl | |

(Continued)

FOREIGN PATENT DOCUMENTS

| | | | | |
|---|---|---|---|---|
| EP | 0205242 | B1 | * | 4/1986 |
| EP | 0205242 | B2 | | 4/1986 |
| EP | 0217032 | | * | 4/1987 |
| EP | 0285430 | A2 | * | 3/1988 |
| EP | 0315013 | A2 | * | 5/1989 |
| EP | 0758675 | A2 | * | 2/1997 |
| EP | 1039007 | A1 | * | 8/1999 |
| EP | 1050612 | A1 | * | 5/2000 |
| JP | 62-081470 | | | 10/1985 |
| JP | 62081470 | | * | 4/1987 |
| JP | 63303109 | | * | 5/1987 |
| JP | 01111016 | | * | 10/1987 |
| JP | 10086256 | | * | 9/1996 |
| JP | 10168726 | | * | 12/1996 |
| JP | 11290381 | | * | 4/1998 |
| JP | 2000314068 | | * | 5/1999 |
| WO | WO 86/07242 | A1 | * | 12/1986 |
| WO | WO 89/05334 | | | 6/1989 |
| WO | WO 96/06966 | A1 | * | 3/1996 |
| WO | WO 99/14039 | A1 | * | 3/1999 |
| WO | WO 99/25296 | | | 5/1999 |
| WO | 99/25296 | | * | 5/1999 |
| WO | WO 00/37723 | A2 | * | 6/2000 |
| WO | WO 00/44412 | A1 | * | 8/2000 |
| WO | WO 01/49913 | A1 | * | 7/2001 |
| WO | WO 02/22344 | A1 | * | 9/2001 |

OTHER PUBLICATIONS

Joseph, Marjory L., Introductory Textile Science 1986, p. 1, Holt, Rinehart and Winston, New York.*

International Search Report from PCT/US2004/033461 dated Feb. 14, 2005.

International Search report from PCT/US2004/033454 dated Feb. 17, 2005.

International Search report from PCT/US2004/038341 dated Feb. 17, 2005.

*Primary Examiner*—Nathan M. Nutter
(74) *Attorney, Agent, or Firm*—Senniger Powers

(57) ABSTRACT

Hot-melt, pressure-sensitive adhesive compositions of amorphous polyalphaolefin and crystalline polypropylene have improved bond strength over the amorphous polyalphaolefin alone. The adhesive compositions improve dynamic shear strength, dynamic peel strength, as well as static peel strength. The adhesive compositions are particularly suitable for use in absorbent articles.

24 Claims, 7 Drawing Sheets

U.S. PATENT DOCUMENTS 4,493,868 A * 1/1985 Meitner
4,554,304 A * 11/1985 Hansen et al.
4,568,713 A * 2/1986 Hansen et al.
4,573,991 A * 3/1986 Pieniak et al.
4,610,681 A * 9/1986 Strohbeen et al.
4,641,381 A * 2/1987 Heran et al.
4,650,481 A 3/1987 O'Conner et al.
4,654,040 A 3/1987 Luceri
4,668,230 A 5/1987 Damico et al.
4,713,068 A 12/1987 Wang et al.
4,719,261 A * 1/1988 Bunnelle et al.
4,761,450 A * 8/1988 Lakshmanan et al.
4,762,520 A * 8/1988 Wallstrom
4,784,892 A * 11/1988 Storey et al.
4,798,603 A * 1/1989 Meyer et al.
4,823,783 A 4/1989 Willhite, Jr. et al.
4,824,889 A * 4/1989 Mostert
4,826,909 A * 5/1989 Lakshmanan et al.
4,833,192 A * 5/1989 Lakshmanan et al.
4,857,594 A * 8/1989 Lakshmanan et al.
4,881,683 A 11/1989 Linnemann
4,937,138 A * 6/1990 Mostert
4,939,202 A * 7/1990 Maletsky et al.
4,940,464 A * 7/1990 Van Gompel et al.
4,949,668 A * 8/1990 Heindel et al.
4,998,928 A * 3/1991 Maletsky et al. ..... 604/365
5,026,752 A * 6/1991 Wakabayashi et al.
5,096,532 A * 3/1992 Neuwirth et al.
5,110,403 A * 5/1992 Ehlert
5,171,239 A 12/1992 Igaue et al.
5,176,668 A * 1/1993 Bernardin
5,176,672 A * 1/1993 Bruemmer et al.
5,192,606 A * 3/1993 Proxmire et al.
5,211,792 A * 5/1993 Carter
5,213,881 A * 5/1993 Timmons et al.
5,219,633 A * 6/1993 Sabee
5,334,446 A * 8/1994 Quantrille et al.
5,336,545 A * 8/1994 Morman
5,344,691 A 9/1994 Hanschen et al.
5,397,846 A * 3/1995 Eichhorn et al.
5,468,320 A * 11/1995 Zafiroglu
5,468,428 A 11/1995 Hanschen et al.
5,472,792 A * 12/1995 Tsurutani et al. ..... 428/516
5,478,891 A * 12/1995 Lakshmanan et al.
5,482,761 A * 1/1996 Palumbo et al.
5,498,463 A * 3/1996 McDowall et al.
5,512,625 A * 4/1996 Butterbach et al.
5,516,572 A 5/1996 Roe
5,516,848 A * 5/1996 Canich et al.
5,530,054 A * 6/1996 Tse et al.
5,536,563 A 7/1996 Shah et al.
5,539,056 A * 7/1996 Yang et al. ..... 525/240
5,548,014 A 8/1996 Tse et al.
5,596,042 A 1/1997 Itoh et al.
5,643,240 A 7/1997 Jackson et al.
5,670,580 A * 9/1997 Tazaki et al.
5,688,259 A 11/1997 Osborn, III et al.
5,705,011 A * 1/1998 Bodford et al.
5,723,546 A * 3/1998 Sustic
5,763,534 A * 6/1998 Srinivasan et al. ..... 525/240
5,773,515 A * 6/1998 Srinivasan et al.
5,785,697 A 7/1998 Trombetta et al.
5,786,418 A * 7/1998 Strelow et al.
5,822,884 A 10/1998 Roeder
5,834,385 A 11/1998 Blaney et al.
5,843,267 A 12/1998 Cashaw et al.
5,849,003 A 12/1998 Olsen et al.
5,882,769 A 3/1999 McCormack et al.
5,888,604 A 3/1999 Evans, Jr. et al.
5,902,297 A * 5/1999 Sauer
5,904,672 A * 5/1999 LeMahieu et al.
5,904,675 A * 5/1999 Laux et al.
5,939,483 A * 8/1999 Kueppers
5,947,949 A 9/1999 Inoue et al.
5,985,971 A * 11/1999 Srinivasan et al.
5,994,614 A 11/1999 Wada et al.
5,998,524 A * 12/1999 Srinivasan et al.
6,008,148 A * 12/1999 Harris et al.
6,024,822 A * 2/2000 Alper et al.
6,034,159 A * 3/2000 Malcolm
6,045,895 A * 4/2000 Hyde et al.
6,080,818 A * 6/2000 Thakker et al.
6,087,550 A * 7/2000 Anderson-Fischer et al.
6,114,261 A * 9/2000 Strelow et al.
6,143,818 A * 11/2000 Wang et al.
6,177,605 B1 1/2001 Trombetta et al.
6,184,294 B1 * 2/2001 Park et al.
6,207,748 B1 * 3/2001 Tse et al.
6,211,272 B1 * 4/2001 Shafer et al.
6,218,457 B1 * 4/2001 Fralich et al.
6,235,356 B1 5/2001 Shibuya et al.
6,239,047 B1 * 5/2001 Erdos et al.
6,248,832 B1 * 6/2001 Peacock
6,248,834 B1 6/2001 Mori
6,284,943 B1 * 9/2001 Osborn, III et al.
6,288,171 B1 9/2001 Finerman et al.
6,329,468 B1 * 12/2001 Wang
6,428,525 B1 8/2002 Malowaniec
6,436,083 B1 8/2002 Mishima et al.
6,482,192 B1 11/2002 Haarer et al.
6,572,596 B1 6/2003 Pargass et al.
6,639,020 B1 10/2003 Brant
6,747,114 B1 6/2004 Karandinos et al.
6,774,069 B1 8/2004 Zhou et al.
6,835,678 B1 12/2004 Jackson et al.
6,887,941 B1 5/2005 Zhou
6,890,630 B1 5/2005 Franklin et al.
2001/0010990 A1 * 8/2001 Erdos et al.
2002/0010265 A1 * 1/2002 Johnson et al.
2002/0019187 A1 * 2/2002 Carroll et al.
2002/0039637 A1 * 4/2002 Meece et al.
2002/0064639 A1 5/2002 Rearick et al.
2002/0098353 A1 * 7/2002 Kollaja et al.
2002/0122953 A1 9/2002 Zhou
2002/0123538 A1 9/2002 Zhou et al.
2002/0123726 A1 9/2002 Zhou et al.
2002/0177376 A1 11/2002 Welch et al.
2003/0092792 A1 5/2003 Blenke et al.
2004/0127123 A1 7/2004 Jordan et al.

* cited by examiner

HOT-MELT ADHESIVE HAVING IMPROVED BONDING STRENGTH

Matter enclosed in heavy brackets [ ] appears in the original patent but forms no part of this reissue specification; matter printed in italics indicates the additions made by reissue.

This application claims the benefit of U.S. provisional Application No. 60/259,037, filed Dec. 29, 2000.

BACKGROUND OF THE INVENTION

People rely on disposable absorbent articles to make their lives easier. Disposable absorbent articles, such as adult incontinence articles and diapers, are generally manufactured by combining several components. These components typically include a liquid-permeable topsheet; a liquid-impermeable backsheet attached to the topsheet; and an absorbent core located between the topsheet and the backsheet. When the disposable article is worn, the liquid-permeable topsheet is positioned next to the body of the wearer. The topsheet allows passage of bodily fluids into the absorbent core. The liquid-impermeable backsheet helps prevent leakage of fluids held in the absorbent core. The absorbent core generally is designed to have desirable physical properties, e.g. a high absorbent capacity and high absorption rate, so that bodily fluids can be transported from the skin of the wearer into the disposable absorbent article.

Frequently one or more components of a disposable absorbent article are adhesively bonded together. For example, adhesives have been used to bond individual layers of the absorbent article, such as the topsheet (also known as, for example, the body-side liner) and backsheet (also known as, for example, the outer cover), together. Adhesives have also been used to bond discrete pieces, such as fasteners and leg elastics, to the article. In many cases, the bonding together of components forms a laminated structure in which adhesive is sandwiched between materials (such as layers of polymer film and/or layers of woven or nonwoven fabrics) that make up the components being bonded together.

In many instances, a hot-melt adhesive, i.e. a polymeric formulation that is heated to substantially liquefy the formulation prior to application to one or both materials when making a laminate, is used in making a laminated structure. While such formulations generally work, they can be costly and their performance properties can be improved. For example, adhesion can be improved to help provide a sturdier laminate (e.g., to improve the integrity or strength of the bond between two components in a disposable absorbent article).

There is a need or desire for an adhesive composition that possesses one or more performance characteristics that are comparable to, or better than, one or more of the same performance characteristics (e.g., bond strength) of a conventional hot-melt adhesive and that will typically cost less than a conventional hot-melt adhesive. Laminated structures and disposable absorbent articles employing the adhesive composition would benefit from these improved characteristics. There is also a need or desire for efficient methods of making the adhesive composition, and efficient methods of making laminated structures and disposable absorbent articles employing the adhesive composition.

SUMMARY OF THE INVENTION

The present invention is generally directed to amorphous polyalphaolefin adhesive compositions having improved bonding strength through the addition of cyrstalline polypropylene. The adhesive compositions have better performance characteristics, e.g. shear and peel bonding strengths, than conventional hot-melt adhesives, and may cost less than conventional hot-melt adhesives.

The combination of amorphous polyalphaolefin (APAO) and crystalline polypropylene possesses desirable adhesive properties and may be used to make laminated structures and disposable absorbent articles. The adhesive compositions of the invention can be applied to a wide variety of substrates, including nonwoven webs, woven webs, and films. The adhesive can be applied in a swirl pattern, can be melt-blown, or can be applied using any technique suitable for hot-melt adhesives.

Without being bound to any particular theory, it appears that such a great difference between bonding strength of the adhesive compositions of the invention and conventional amorphous polyalphaolefin adhesives may be attributed to cyrstallization of crystalline, or isotactic, polypropylene, which generates physical intermolecular linking in the matrix of APAO.

As stated above, a material comprising a combination of an APAO and crystalline polypropylene may cost less than a conventional hot-melt adhesive. Generally this is because conventional hot-melt adhesives are typically formulated by combining several components, including a polymer or polymers for cohesive strength; resins, tackifiers, or other generally low molecular-weight materials for adhesive strength; viscosity modifiers such as oils or wax-like materials; and other additives (e.g., antioxidants). In some versions of the invention, a combination of the APAO and crystalline polypropylene alone provides improved bond characteristics compared to conventional hot-melt adhesives. But it should be understood that the invention encompasses adhesive compositions that include selected amorphous polyalphaolefins and crystalline polypropylenes, combined with other additives or materials.

Another advantage present in some versions of the invention is that the material of the invention may be used in conventional hot-melt-adhesive processing equipment. Thus, the adhesive material may be used in equipment already installed for the purpose of processing and applying conventional hot-melt adhesives.

Apart from whether or not adhesive compositions of the present invention cost less than conventional hot-melt adhesives, we have found that representative embodiments of the present invention possess improved performance characteristics compared to the performance characteristics of conventional hot-melt adhesives. These performance benefits may justify processing and applying adhesive compositions of the present invention in modified conventional-hot-melt-adhesive equipment, or in equipment especially designed and built for the purpose of processing and applying adhesive compositions of the present invention. Furthermore, these performance benefits may justify adhesive compositions of the present invention, in some instances, being at a higher cost than conventional-hot-melt adhesives.

These and other features, aspects, and advantages of the present invention will become better understood with regard to the following description, appended claims, and accompanying drawings.

DETAILED DESCRIPTION OF THE PRESENTLY PREFERRED EMBODIMENTS

Figure 1A:
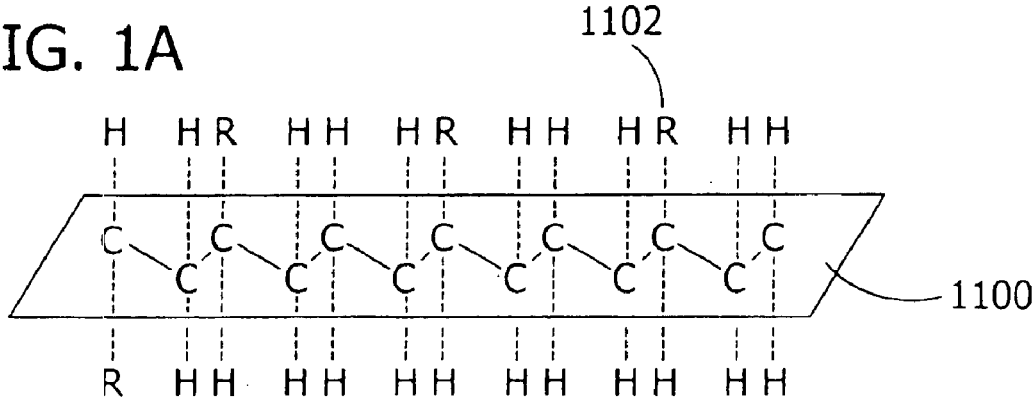
FIG. 1 gives symbolic representations of syndiotactic, isotactic, and atactic configurations of a polymer.

The present invention is generally directed to adhesive compositions comprising amorphous polyalphaolefin (APAO) and crystalline polypropylene. Adhesive compositions of the present invention generally perform better, and typically cost less, than conventional hot-melt adhesives. Furthermore, these compositions may typically be processed and applied using conventional hot-melt adhesive processing equipment. Generally new equipment will not be necessary to use adhesive compositions of the present invention.

Before describing representative embodiments of the invention, it is useful to define a number of terms for purposes of this application. These definitions are provided to assist the reader of this document.

"Nonwoven" fabric or web means a web having a structure of individual fibers or threads that are interlaid, but not in a regular or identifiable manner as in a knitted fabric. Nonwoven fabrics or webs have been formed from many processes such as, for example, meltblowing processes, spunbonding processes, air laying processes, and bonded carded web processes. The basis weight of nonwoven fabrics is usually expressed in ounces of material per square yard (osy) or grams per square meter (gsm) and the fiber diameters are usually expressed in microns. (Note: to convert from osy to gsm, multiply osy by 33.91.)

"Woven" fabric or web means a fabric or web containing a structure of fibers, filaments, or yarns, which are arranged in an orderly, inter-engaged fashion. Woven fabrics typically contain inter-engaged fibers in a "warp" and "fill" direction. The warp direction corresponds to the length of the fabric while the fill direction corresponds to the width of the fabric. Woven fabrics can be made, for example, on a variety of looms including, but not limited to, shuttle looms, rapier looms, projectile looms, air jet looms, and water jet looms.

"Spunbonded fibers", or "spundbond fibers", means small-diameter fibers that are typically formed by extruding molten thermoplastic material as filaments from a plurality of fine capillaries of a spinneret having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Petersen, and U.S. Pat. No. 3,542,615 to Dobo et al., each of which is incorporated by reference in its entirety and in a manner consistent with the present document. Spunbond fibers are quenched and generally not tacky when they are deposited onto a collecting surface. Spunbond fibers are generally continuous and often have average diameters larger than about 7 microns, and more particularly between about 10 and 30 microns. A spunbond material, layer, or substrate comprises spunbonded (or spunbond) fibers.

The term "meltblown fibers" means fibers formed by extruding a molten material, typically thermoplastic in nature, through a plurality of fine, usually circular, die capillaries as molten threads or filaments into converging high-velocity heated gas (e.g., air) streams that attenuate the filaments of molten material to reduce their diameter, which may be to microfiber diameter. Thereafter, the meltblown fibers are carried by the high-velocity gas stream and are deposited on a collecting surface to form a web of randomly dispersed meltblown fibers. Such a process is disclosed for example, in U.S. Pat. No. 3,849,241 to Butin. Meltblown fibers are microfibers which may be continuous or discontinuous, are generally smaller than 10 microns in diameter, and are generally self-bonding when deposited onto a collecting surface.

As used herein, the term "microfibers" means small-diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, U.S. Pat. No. 5,213,881, entitled "A Nonwoven Web With Improved Barrier Properties".

"Amorphous polyalphaolefin" refers to a polymer that can include random copolymers or terpolymers of ethylene, propylene, and butene, and other substantially amorphous or semi-crystalline propylene-ethylene polymers. Suitably, the amorphous polyalphaolefin (APAO) includes between about 20% and about 80% copolymers or terpolymers and between about 20% and about 80% other substantially amorphous or semi-crystalline propylene-ethylene polymers. Alternatively the APAO includes between about 30% and about 70% copolymers or terpolymers and between about 30% and about 70% other substantially amorphous or semi-crystalline propylene-ethylene polymers. As yet another alternative, the APAO includes between about 40% and about 60% copolymers or terpolymers and between about 40% and about 60% other substantially amorphous or semi-crystalline propylene-ethylene polymers.

"Crystalline polypropylene" refers to certain homopolymer polypropylenes having at least 40% crystallinity, as well as certain polypropylene copolymers having at least 40% crystallinity.

"Conventional hot-melt adhesive" means a formulation that generally comprises several components. These components typically include one or more polymers to provide cohesive strength (e.g., aliphatic polyolefins such as poly (ethylene-co-propylene) copolymer; ethylene vinyl acetate copolymers; styrene-butadiene or styrene-isoprene block copolymers; etc.); a resin or analogous material (sometimes called a tackifier) to provide adhesive strength (e.g., hydrocarbons distilled from petroleum distillates; rosins and/or rosin esters; terpenes derived, for example, from wood or citrus, etc.); perhaps waxes, plasticizers or other materials to modify viscosity (i.e., flowability) (examples of such materials include, but are not limited to, mineral oil, polybutene, paraffin oils, ester oils, and the like); and/or other additives including, but not limited to, antioxidants or other stabilizers. A typical hot-melt adhesive formulation might contain from about 15 to about 35 weight percent cohesive strength polymer or polymers; from about 50 to about 65 weight percent resin or other tackifier or tackifiers; from more than zero to about 30 weight percent plasticizer or other viscosity modifier; and optionally less than about 1 weight percent stabilizer or other additive. It should be understood that other adhesive formulations comprising different weight percentages of these components are possible.

While certain versions of the present invention encompass combinations of an APAO and crystalline polypropylene only, it should be understood that other embodiments of the present invention comprise components in addition to combinations of APAO and crystalline polypropylene.

"Hot-melt processable" means that an adhesive composition may be liquefied using a hot-melt tank (i.e., a system in which the composition is heated so that it is substantially in liquid form) and transported via a pump (e.g., a gear pump or positive-displacement pump) from the tank to the point of application proximate a substrate or other material; or to another tank, system, or unit operation (e.g., a separate system, which may include an additional pump or pumps, for delivering the adhesive to the point of application). Hot-melt tanks used to substantially liquefy a hot-melt adhesive typically operate in a range from about 100 degrees Fahrenheit to about 450 degrees Fahrenheit. Generally, at the point of application, the substantially liquefied adhesive composition will pass through a nozzle or bank of nozzles, but may pass through some other mechanical element such as a slot. A hot-melt processable adhesive composition is to be contrasted with a composition that requires a conventional extruder, and the attendant pressures and temperatures characteristic of an extruder, to liquefy, mix, and/or convey the composition. While a hot-melt tank and pump in a hot-melt processing system can handle adhesive-composition viscosities in a range from about 1000 centipoise to about 10,000 centipoise, an extruder can handle and process adhesive-composition viscosities in a range from about 10,000 centipoise to viscosities of several hundred thousand centipoise. An advantage of some adhesive compositions of the present invention is that the compositions are hot-melt processable; i.e., the combination of APAO and crystalline polypropylene may be substantially liquefied in a hot-melt tank and conveyed to the point of application via a pump. As was stated above, however, some adhesive compositions of the present invention may not possess this particular advantage.

Unless otherwise noted, "Laminated structure" or "laminate" means a structure in which one layer, material, component, web, or substrate is adhesively bonded, at least in part, to another layer, material, component, web, or substrate. As stated elsewhere in this application, a layer, material, component, web, or substrate may be folded over and adhesively bonded to itself to form a "laminated structure" or "laminate."

"Polymer", as used herein, generally includes, but is not limited to, homopolymers, copolymers, such as, for example, block, graft, random and alternating copolymers, terpolymers, and blends and modifications thereof. As is explained in this document, polymers may assume different configurations, including isotactic, atactic, and syndiotactic configurations. "Configuration" describes those arrangements of atoms that cannot be altered except by breaking and reforming primary chemical bonds (i.e., covalent bonds). In contrast, "conformation" describes arrangements that can be altered by rotating groups of atoms around single bonds. It should be noted that a single polymer chain may be synthesized such that some portions of the chain have an isotactic configuration and some portions of the chain have an atactic configuration.

Figure 1B:
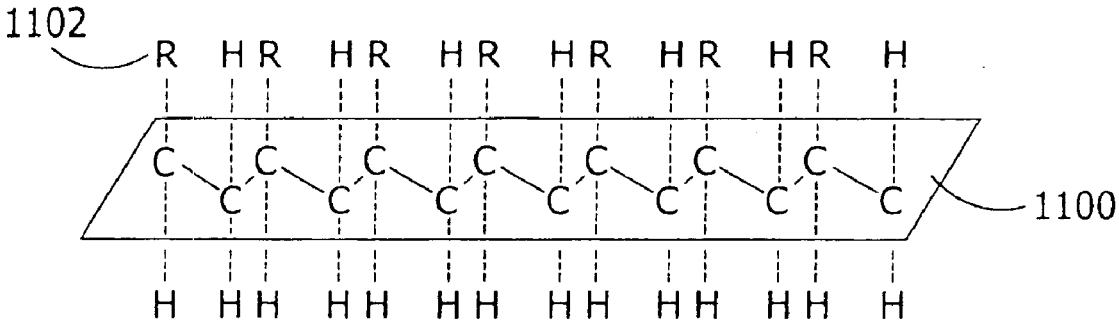
Figure 1C:
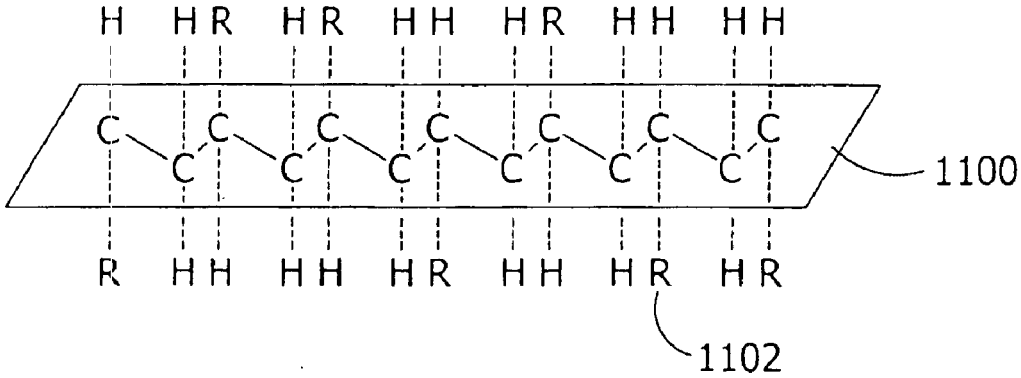

A graphic example provides additional detail on the types of configurations mentioned above. If a polymer chain is depicted in a fully-extended, planar, zigzag conformation 1100, the configuration resulting when all the substituent groups R 1102 on the polymer lie above (depicted in FIG. 1B) or below (not depicted) the plane of the main chain is called "isotactic". If substituent groups lie alternately above and below the plane the configuration is called "syndiotactic" (depicted in FIG. 1A). And a random sequence of substituents lying above and below the plane is described as an "atactic" configuration (depicted in FIG. 1C). A polymer, or a region of a polymer, having an isotactic configuration is more likely to assume characteristics of a crystalline structure. Pure isotactic polymers are rare. For purposes of this invention, the term "isotactic polymer" refers to a polymer that is at least 60% isotactic, suitably at least 70% isotactic, alternatively at least 80% isotactic. A polymer, or a region of a polymer, having an atactic configuration is more likely to assume characteristics of an amorphous structure. An atactic polymer may assume some crystallinity, but the degree of crystallinity is typically less than 20%, or less than 15%. For purposes of this invention, the term "atactic polymer" refers to a polymer that may not be 100% atactic, but is at least 90% atactic. Similarly, for the purposes of this invention, the term "amorphous polymer" may assume some crystallinity, but the degree of crystallinity is typically less than 20% or less than 15%. And a polymer, or a region of a polymer, having a syndiotactic configuration can assume characteristics of a crystalline structure, but to a degree less than the degree of crystallinity in an isotactic configuration.

Figure 2:
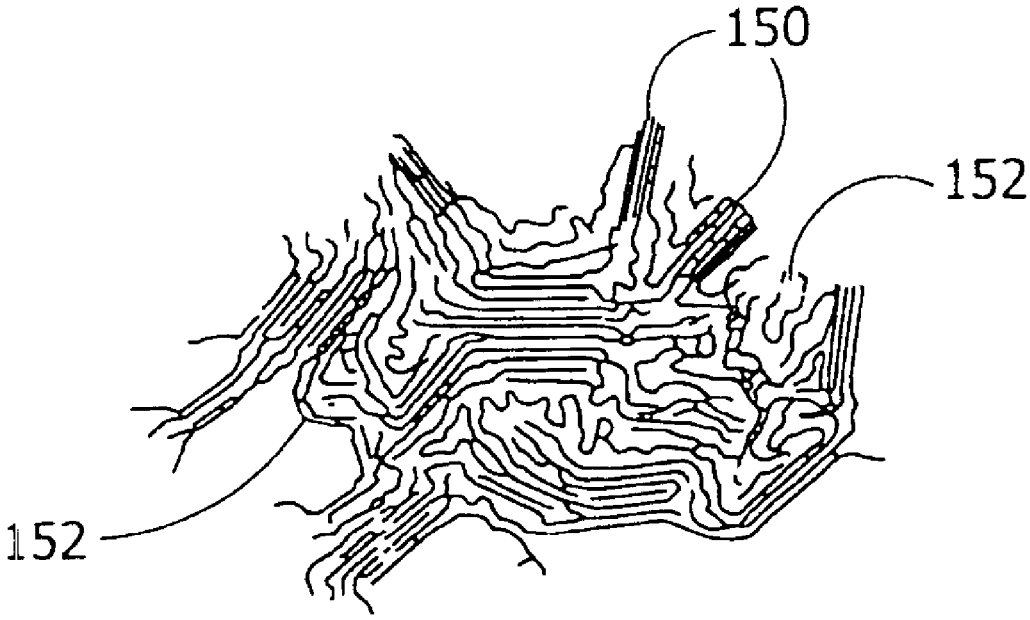
FIG. 2 gives a visual representation of a fringed-micelle model of a material having both amorphous and crystalline regions.

In this application, "fringed-micelle model" means a theoretical construct characterizing polymeric structures that have both crystalline 150 and amorphous 152 regions (one version of a graphic depiction of a fringed-micellar structure is presented in FIG. 2). This model may be used to characterize the structure of an atactic polymer and an isotactic polymer individually, i.e., each polymer possesses both crystalline regions and amorphous regions. As explained above, the isotactic polymer likely possesses a greater degree of crystallinity compared to an atactic polymer. Furthermore, this model may be used to characterize the structure of a blend of isotactic polymer and atactic polymer. It should be understood that this model provides one possible view of characteristics of the present invention and in no way limits the scope thereof.

One version of an adhesive composition possessing features of the present invention comprises an APAO, such as a butene-1 copolymer with ethylene or propylene, or a butene-1 terpolymer with ethylene and propylene, having a number-average molecular weight of from about 5,000 to about 30,000, specifically about 10,000 to about 20,000. The butene-1 copolymer should include about 20% to about 65% by weight butene-1, or about 30% to about 55% by weight butene-1, and a balance of the comonomer or comonomers. Alternatively, the APAO may include an ethylene-propylene copolymer having up to 80% ethylene. An example of a commercially available APAO suitable for use in the invention is REXTAC® 2730, or RT 2730, available from Huntsman Corporation, Salt Lake City, Utah.

The composition also includes crystalline polypropylene having a degree of crystallinity of about 40% or more, specifically of about 60% or more, particularly of about 80% or more, and a number-average molecular weight of from about 3000 to about 200,000, more particularly of about 10,000 to about 100,000. An example of a commercially available crystalline polypropylene suitable for use in the invention is isotactic polypropylene, available from Sigma-Aldrich. The crystalline polypropylene may also include syndiotactic polypropylene, or combinations of isotactic and syndiotactic polypropylene. The adhesive composition is hot-melt processable at a temperature of about 450 degrees Fahrenheit or less, specifically at a temperature of about 400 degrees Fahrenheit or less, particularly at a temperature of about 375 degrees Fahrenheit or less, and suitably at a temperature of about 350 degrees Fahrenheit or less.

This adhesive composition can have a melt index between about 200 and about 2000 grams per 10 minutes, or between about 400 and about 1800 grams per 10 minutes, or between about 500 and about 1500 grams per 10 minutes, as determined using ASTM D 1238, 230° C./2.16 kg Method. The melt index is dependent upon the crystallinity, molecular weight, and the molecular weight distribution of the polymers included in the adhesive composition.

In some versions of the invention, the APAO is present in an amount of about 70 to about 90 weight percent and the crystalline polypropylene is present in an amount of about 10 to about 30 weight percent. In another embodiment of the invention, the APAO is present in an amount of about 73 to about 87 weight percent and the crystalline polypropylene is present in an amount of about 13 to about 27 weight percent. In yet another embodiment of the invention, the APAO is present in an amount of about 75 to about 85 weight percent and the crystalline polypropylene is present in an amount of about 15 to about 25 weight percent. For purposes of this invention, weight percent is defined as the mass of one type of polymer (e.g., APAO) in the adhesive composition divided by the sum of the masses of other types of polymer (e.g., APAO and crystalline polypropylene) in the adhesive composition, plus the mass(es) of any additional component(s) that might be present in the adhesive composition, with this value being multiplied by 100. So, for example, if we form an adhesive composition comprising 80 grams of APAO with 20 grams of crystalline polypropylene, the combination includes 80 weight percent APAO.

In another aspect, the invention encompasses laminated structures employing embodiments of the adhesive composition as described above. For example, one version of a laminated structure of the present invention comprises a first layer and a second layer, wherein at least a portion of the first layer is attached to at least a portion of the second layer using an adhesive composition that is the same as, or analogous to, one or more of the embodiments described above, and wherein the laminated structure has improved dynamic peel strength, improved dynamic shear strength, and improved static-peel-failure time, relative to conventional hot-melt adhesive compositions.

For any of the laminated structures described above, the first and second layer may be part of one-and-the-same substrate. That is, the substrate may be folded over and joined to itself using an adhesive composition of the present invention.

Furthermore, the first layer, second layer, or both may comprise a variety of materials, including, but not limited to a nonwoven (e.g., a necked-bonded laminate or a spun-bond material); a film; a woven material; a substrate comprising cellulosic material, thermoplastic material, or both; some combination of these; or the like.

In yet another aspect, an absorbent article may be formed that employs an adhesive composition of the present invention and/or a laminated structure of the present invention. So, for example, one version of an absorbent article of the present invention comprises a liquid-permeable topsheet; a liquid-impermeable backsheet; and a laminated structure having features of the present invention, such as one or more of the versions described above. Some or all of the backsheet may include the laminated structure; some or all of the topsheet may include the laminated structure; the laminated structure may be attached, directly or indirectly, to the backsheet, the topsheet, or both; or a laminated structure or structures may be present in some combination of these.

In addition to various versions of adhesive compositions, laminated structures, and absorbent products of the present invention, the present invention also encompasses methods of making these compositions, structures, and articles of manufacture.

One version of a method of making a laminated structure having features of the present invention comprises the steps of providing a first substrate; providing a second substrate; providing an APAO having a weight-average molecular weight of from about 20,000 to about 60,000, specifically about 25,000 to about 50,000; and providing an isotactic polypropylene, namely a crystalline polypropylene having a degree of crystallinity of about 40% or more, specifically of about 60% or more, particularly of about 80% or more, and a weight-average molecular weight of from about 20,000 to about 300,000, more particularly of about 35,000 to about 200,000. The APAO and the crystalline polypropylene are heated so that they are sufficiently liquefied for blending. The heated APAO and the heated crystalline polypropylene are blended to form an adhesive composition that is melt-processable at a temperature of less than about 450 degrees Fahrenheit, specifically of less than about 400 degrees Fahrenheit, particularly of less than about 375 degrees Fahrenheit, and suitably of less than about 350 degrees Fahrenheit. The adhesive composition is applied to the first substrate, the second substrate, or both substrates. At least a portion of the first substrate is joined to at least a portion of the second substrate so that some or all of the applied adhesive composition is positioned between the first substrate and second substrate.

In some methods of the present invention, the APAO is present in an amount of about 70 to about 90 weight percent and the crystalline polypropylene is present in an amount of about 10 to about 30 weight percent. In other methods of the invention, the APAO is present in an amount of about 73 to about 87 weight percent and the crystalline polypropylene is present in an amount of about 13 to about 27 weight percent. In still other embodiments of the invention, the APAO is present in an amount of about 75 to about 85 weight percent and the crystalline polypropylene is present in an amount of about 15 to about 25 weight percent.

It should be understood that the APAO and crystalline polypropylene could be heated and blended at a site other than the site where the laminate is being formed. For example, APAO and crystalline polypropylene could be blended using an extruder/sigma blade mixer or hot-melt processing equipment at a first geographic location. The blend could then be allowed to cool and processed to make a solid form (e.g., block or brick). The APAO/crystalline polypropylene blend, in solid form, could then be shipped from the first geographic site to a site where a laminate is to be made. The blend, in solid form, would simply be heated to substantially liquefy the adhesive composition prior to its being used to make a laminate.

It should also be understood that a method having features of the present invention encompasses different sequences of steps by which the adhesive composition is made. For example, the APAO could be heated in a first container. The crystalline polypropylene could be heated in a second container, before, after, or concurrently with the heating of the APAO. Then, the two substantially liquefied polymers could be blended in the first container, the second container, or a third container. Alternatively, one of an APAO or crystalline polypropylene could be heated in a container, and after the selected polymer is substantially liquefied, the remaining polymer could be added to the same container to be heated and blended. In another alternative, the APAO and crystalline polypropylene could be added to the same container to be heated and blended at the same time. In other words, our invention contemplates various methods and sequences by which selected amounts of APAO and crystalline polypropylene (plus any other optional additives) are heated and blended to form an adhesive composition of the present invention.

The preceding discussion assumes that the APAO and crystalline polypropylene are in substantially solid form at room temperature, or temperatures that are typically present in a working environment suitable for human beings. To the extent that the APAO or crystalline polypropylene is available in substantially liquid form, then those steps providing for heating and liquefying that material (i.e., the already-liquefied material) can be omitted from methods of the present invention.

A method of making an adhesive composition having features of the present invention comprises the steps of providing an APAO having a weight-average molecular weight of from about 20,000 to about 60,000, specifically about 25,000 to about 50,000, and providing an isotactic polypropylene, namely a crystalline polypropylene having a degree of crystallinity of about 40% or more, specifically of about 60% or more, particularly of about 80% or more, and a number-average molecular weight of from about 3000 to about 200,000, more particularly of about 10,000 to about 100,000. The APAO and the crystalline polypropylene are heated so that they are sufficiently liquefied for blending. The heated APAO and the heated crystalline polypropylene are blended to form an adhesive composition that is melt-processable at a temperature of less than about 450 degrees Fahrenheit, specifically of less than about 400 degrees Fahrenheit, particularly of less than about 375 degrees Fahrenheit, and suitably of less than about 350 degrees Fahrenheit.

In some methods of the present invention, the APAO is present in an amount of about 70 to about 90 weight percent and the crystalline polypropylene is present in an amount of about 10 to about 30 weight percent. In other methods of the invention, the APAO is present in an amount of about 73 to about 87 weight percent and the crystalline polypropylene is present in an amount of about 13 to about 27 weight percent. In still other embodiments of the invention, the APAO is present in an amount of about 75 to about 85 weight percent and the crystalline polypropylene is present in an amount of about 15 to about 25 weight percent.

One version of a method in which an adhesive composition of the present invention is metered or delivered at a desired rate to a unit operation (e.g., a unit operation where the adhesive composition is applied to a substrate or substrates in order to make a laminate) comprises the steps of: determining the amount of adhesive composition being used by the unit operation per unit time; and force-adjusting the volumetric flow rate or the mass flow rate of the adhesive composition so that the amount of adhesive composition being metered or delivered to the unit operation corresponds to the amount of adhesive composition being used by the unit operation per unit time.

In the process description that follows, the preparation, processing, and application of an adhesive composition including APAO and crystalline polypropylene is described. It should be understood, however, that this description is given as an example. Other processing methods and equipment may be used to prepare and deliver various adhesive compositions of the present invention.

Figure 3:
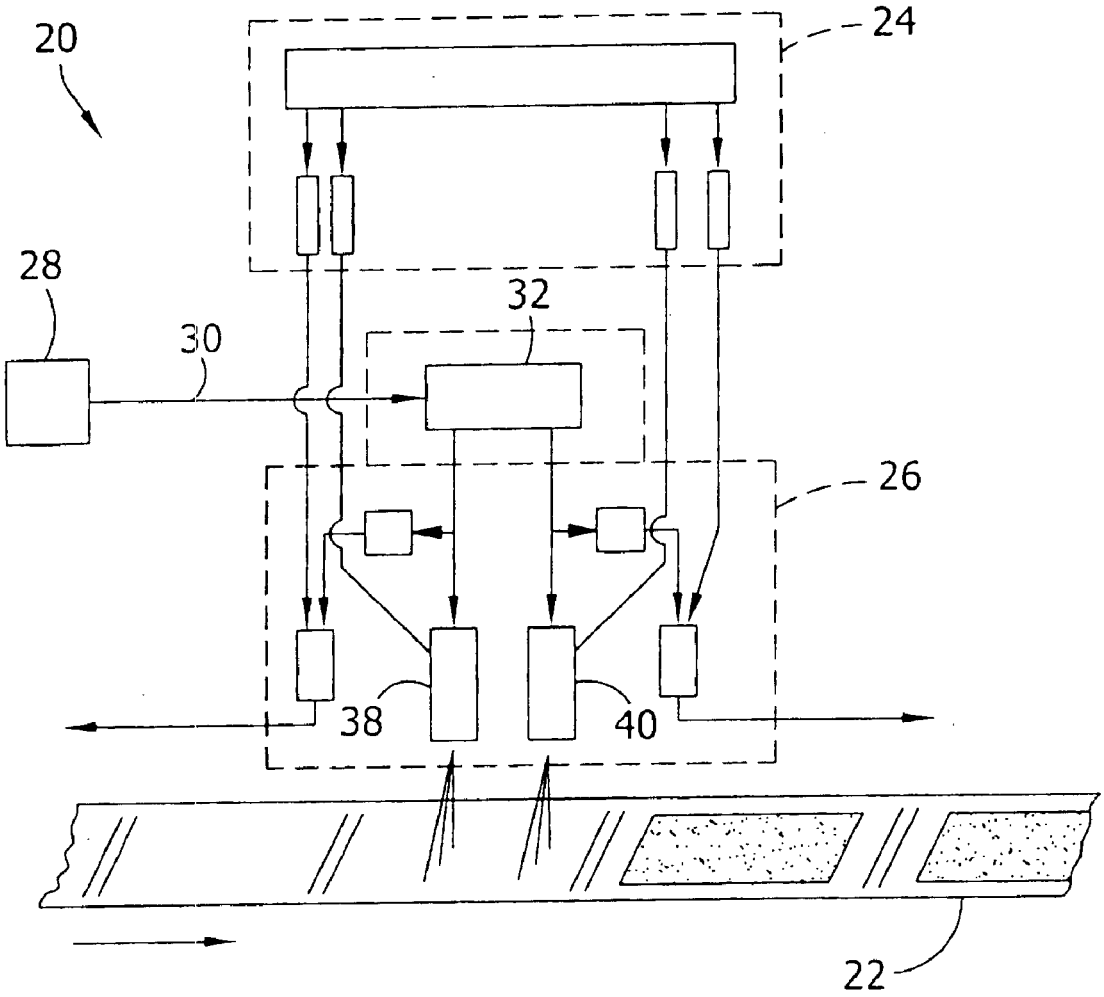
FIG. 3 shows a schematic diagram of one version of a method and apparatus for preparing, processing, and delivering an adhesive composition.

FIG. 3 shows a schematic diagram of an apparatus 20, and a method for spraying an adhesive composition, on a moving web 22. The apparatus 20 may include a programmable control system 24 that is operatively connected to a flow-control system 26. The combination of the programmable control system 24 and the flow-control system 26 are configured to control the delivery of an adhesive composition in liquid form to the moving web 22. Generally an adhesive composition is received in solid form at a manufacturing site where equipment such as that depicted in FIG. 3 is located. For example, hot-melt adhesive compositions may be received as solid pellets, blocks, or some other shape. The solid is then heated so that the hot-melt adhesive composition is in a form such that it can be conveyed, and applied, to a substrate or other material. Usually this requires that the heated hot-melt adhesive be in substantially liquid form. For the present invention, an adhesive composition comprising an APAO and crystalline polypropylene (e.g., butene-1 copolymer and crystalline polypropylene), in solid form, might be received at a manufacturing site for heating and processing as described above. Alternatively, the APAO and crystalline polypropylene might be received as separate components to be blended at the manufacturing site. As discussed above, the present invention encompasses a variety of sequences of steps for making adhesive compositions of the present invention. An example of equipment and methods for heating an adhesive composition, or precursor materials to the adhesive composition, are described in more detail below.

The apparatus may also include a position-sensing system that is configured to sense a position of the moving web 22 and, in response thereto, generate a signal that is sent to the programmable control system 24.

As representatively illustrated in FIG. 3, the continuously moving web 22 may be supplied by any means known to those skilled in the art, such as known conveyor systems. The continuously moving web 22 can include any type of layer or web of material, such as films, nonwoven webs, woven webs which may include strands of thermoplastic material; natural material such as threads of cotton and the like, laminate materials, or combinations thereof. More particularly, the continuously moving web 22 may include a necked-bonded laminate ("NBL"), which generally comprises a polyethylene layer sandwiched between two polypropylene, spunbonded layers; a polypropylene, spunbonded layer ("SB"); or an outercover comprising a polyethylene layer and a polypropylene, spunbonded layer. For additional detail on how NBLs and other neck-bonded materials are formed, see U.S. Pat. No. 5,336,545 to Morman, entitled "Composite Elastic Necked-Bonded Material" which is hereby incorporated by reference in its entirety in a manner consistent with the present document.

As is described below in more specific terms, the adhesive is sprayed on the continuously moving web 22 in a specific design or pattern for subsequent placement of or bonding to another material. The other material can be the same or different than the web to which adhesive was applied. In some cases adhesive might be applied to both substrates before they are joined together. And, as mentioned above, one substrate might be folded over and attached to itself to form a laminated structure.

The programmable control system 24 of the present invention is configured to send signals to the flow control system 26 which, in response thereto, is configured to initiate a spray of adhesive at the correct time to provide the desired pattern of adhesive on the moving web 22. As representatively illustrated in FIG. 3, the flow control system 26 includes an adhesive source 28 which is configured to deliver an adhesive through an adhesive supply line 30 to a metering mechanism 32. The adhesive can be delivered to the metering mechanism 32 by any means known to those skilled in the art, such as by the use of a pump.

The metering mechanism 32 is configured to continuously supply at least one independent, volumetric flow of adhesive to a respective nozzle. As used herein, the term "volumetric flow" refers to a flow of adhesive that has a predetermined volumetric flow rate. Such a "volumetric flow" may be provided by a positive-displacement metering pump which is configured to supply a specific volumetric flow which is independent of the manner in which the adhesive is supplied to the metering mechanism 32. As a result, for an adhesive that is at a given density, the metering mechanism 32 is configured to provide an independent, predetermined mass flow rate of adhesive to each nozzle. Other adhesive processing and delivery systems utilize pressure to provide a flow of adhesive.

The metering mechanism 32 of the present invention may be configured to supply a single, volumetric flow of adhesive to one nozzle or an independent, volumetric flow of adhesive to each of a plurality of nozzles depending upon the number of nozzles required to provide the desired pattern of adhesive on the moving web 22. A suitable device to provide the metering mechanism 32 may include a positive-displacement metering pump which is commercially available from May Coating Technologies, Acumeter Division, a business having offices located in Holliston, Mass., under the trade designation No. 19539. The metering mechanism 32 may include any other piston pump or gear pump which are well known to those skilled in the art.

The metering mechanism 32 may be configured to supply any desired volumetric flow rate of adhesive to each nozzle. For example, the metering mechanism 32 may be configured to provide a pre-determined volumetric flow rate of from about 1 to about 1000 cubic centimeters per minute and suitably from about 30 to about 180 cubic centimeters of adhesive per minute to each nozzle. The metering mechanism 32 may be configured to provide either a constant or a variable volumetric flow rate of adhesive to each nozzle. For example, if the metering mechanism 32 is a positive-displacement metering pump, the speed of the pump may be controlled to vary the volumetric flow rate of adhesive to the nozzles.

Each nozzle 38 and 40 as representatively illustrated in FIG. 3 can be any device which is capable of providing the desired pattern of adhesive on the moving web 22. For example, one suitable nozzle is commercially available from Nordson Corporation, a business having offices located in Duluth, Ga., under the trade designation Model No. 144906. Another suitable nozzle for use in the present invention is obtainable from ITW Dynatec Co. of Hendersonville, Tenn., under the trade designation number 057B1639,1.D. #A3. Such nozzles are typically configured to be operated between an on position and an off position to control the spray of adhesive from the nozzles. When operated in the on position, each nozzle may be configured to spray substantially the entire volumetric flow of adhesive which is independently supplied to it to more accurately control the amount and pattern of the adhesive on the moving web. The nozzles 38 and 40 may further be configured to include air streams that can be directed to provide a desired pattern in the spray of adhesive being dispensed from each nozzle. Such air streams can provide a desired adhesive spray pattern, such as a pattern of swirls of adhesive. The adhesive can be applied to the moving web 22 in a concentration of between about 1 gram per square meter (gsm) and about 50 gsm, or between about 5 gsm and about 20 gsm.

After the pattern of adhesive has been sprayed on the moving web 22, the web may be further processed in a variety of ways. For example, the continuously moving web 22 may be contacted by a second substrate web, such as a nonwoven layer, between a pair of nip rolls to adhesively join the two substrate webs together. Thereafter, this composite material or laminate may be used in a variety of ways such as in the construction of disposable absorbent articles such as diapers, incontinent articles, training pants, feminine care articles and the like.

The above discussion provides one example of hot-melt processing equipment 15 and a system for applying adhesive to a substrate. It should be understood that this is but one example, and that the present invention encompasses other systems for preparing and applying adhesives (see, e.g., U.S. Pat. No. 4,949,668, entitled "Apparatus for Sprayed Adhesive Diaper Construction," which issued on Aug. 21, 1990, and which is hereby incorporated by reference in its entirety and in a manner consistent with the present document).

Regardless of the system used to apply the adhesive, the resulting composite material or laminate may be exposed to thermal, infrared, ultrasonic, or other forms of energy in subsequent unit operations or processing steps. For example, the laminate or composite material may pass through an ultrasonic-bonding unit operation wherein the laminate or composite material are exposed to ultrasonic energy. After exemplary composite materials or laminates such as those referred to above are formed using an adhesive composition of the present invention, some or all of the composite or laminate may be exposed to ultrasonic energy. Referring to PCT International Publication Number WO 99/25296, which is hereby incorporated by reference in its entirety in a manner consistent with the present document, the publication discloses the use of ultrasonic bonding to form side seams or seals in the disposable underpant. (See, e.g., page 29, lines 10–25; additional detail regarding the forming of such side seals is disclosed in U.S. Pat. No. 4,610,681, which issued on Sep. 9, 1986 and is entitled "Disposable Underpants Having Discrete Outer Seals," and which is hereby incorporated by reference in a manner consistent herewith; and U.S. Pat. No. 4,641,381, which issued on Feb. 10, 1997 and is entitled "Disposable Underpants, Such as Infant's Training Pants and the Like," which is also incorporated by reference in a manner consistent with the present document.)

Thus, adhesives of the present invention, used to make laminates and composite materials, may be exposed to ultrasonic energy when ultrasonic-bonding equipment is used in subsequent processing steps (e.g., when the ultrasonic bonding equipment is used to form the seams or seals in the disposable absorbent article as discussed above).

Specific examples of composite materials, laminates, and disposable absorbent articles with which adhesives of the present invention may be utilized are disclosed in the following U.S. Patents and U.S. Patent Applications: U.S. Pat. No. 4,798,603 issued Jan. 17, 1989, to Meyer et al.; U.S. Pat. No. 5,176,668 issued Jan. 5, 1993, to Bernadine; U.S. Pat. No. 5,176,672 issued Jan. 5, 1993, to Bruemmer et al.; U.S. Pat. No. 5,192,606 issued Mar. 9, 1993, to Proxmire et al.; U.S. Pat. No. 4,940,464, entitled "Disposable Incontinence Garment or Training Pant"; U.S. Pat. No. 5,904,675, entitled "Absorbent Article With Improved Elastic Margins and Containment System"; U.S. Pat. No. 5,904,672, entitled "Absorbent Article Having Improved Waist Region Dryness and Method of Manufacture"; and U.S. Pat. No. 5,902,297, entitled "Absorbent Article Having a Collection Conduit." Each of the preceding U.S. patents is incorporated by reference in its entirety and in a manner consistent with the present document. More specifically, the types of absorbent articles in which the adhesives of the present invention may be used include diapers, children's training pants, swim wear, incontinence products, feminine care products, other personal care or health care garments, including medical garments, or the like. It should be understood that the present invention is applicable to other structures, composites, or products incorporating adhesive compositions of the present invention.

Additional Detail on Representative Process-Control Embodiments

Figure 4A:
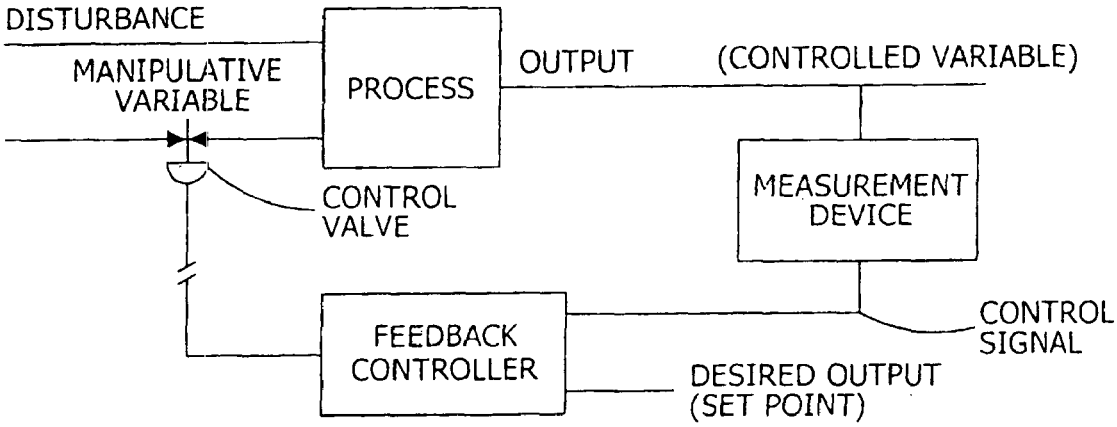
FIG. 4A shows one version of a feedback control scheme.
Figure 4B:
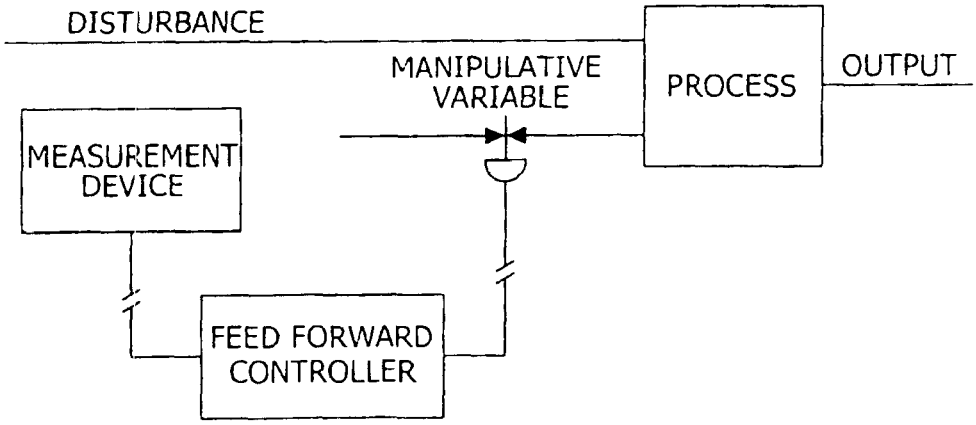
FIG. 4B shows one version of a feedforward control scheme.

As discussed above, process-control systems may be used to control the volumetric or mass flow rate of adhesive compositions of the present invention to a point of application (e.g., to a point of application on a substrate, layer, or web that will be used to make a laminate or composite material). Persons of ordinary skill in the art of process control are familiar with the various process-control strategies, algorithms, and equipment used to control a process. Some of the possible strategies that may be used to control a process include feedback-control strategies (i.e., a process in which a variable to be controlled is measured, the measured value is compared to a desired value, and the difference between the measured value and the desired value is transmitted to a feedback controller that force adjusts a manipulative variable to drive the measured variable back to the desired value) (see, e.g., FIG. 4A); feedforward-control strategies (i.e., process in which a disturbance entering a process is detected, and an appropriate change is made to a manipulative variable so that an output variable is held constant; see, e.g., FIG. 4B); and the like.

Figure 5:
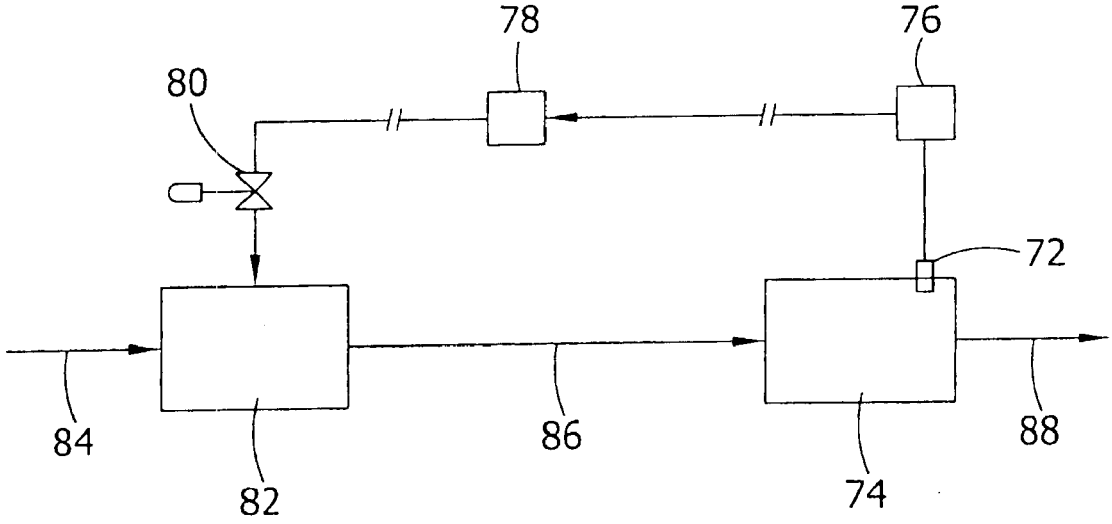
FIG. 5 shows one version of a process control system.

One example of a process-control system is depicted in FIG. 5. A sensor may be used to determine a signal $S_1$ corresponding to the variable to be controlled, e.g. the volumetric or mass flow rate of adhesive being sprayed or delivered in an adhesive-application unit operation 74. This signal may then be relayed electrically, pneumatically, hydraulically, or by other means to a transmitter 76, which converts the signal $S_1$ into a control signal $M_1$. The transmitter transmits the control signal $M_1$ to the controller 78.

After receiving the control signal $M_1$, the controller sends the corresponding output signal $R_1$ to the control element 80. The control element, such as an electronic or pneumatic control valve, responds to the output signal $R_1$ by opening or closing, thus effecting the desired change to the variable being manipulated, in this case the volumetric or mass flow rate of adhesive. Alternatively, the control element might effect a desired change to the speed at which a pump operates, thereby controlling the mass or volumetric flow rate of adhesive.

As mentioned above, an air-pressure, electrical, pneumatic, or other signal may be used to transmit information (e.g., the various signals discussed in the preceding paragraphs) from one device to another (e.g., from a sensor, to a transmitter, to a controller, to a control element, or to some combination of some or all of these). For example, the controller may be a device that converts a control signal into an equivalent air-pressure, electrical, pneumatic, or other output signal. This air-pressure electrical, pneumatic or other output signal is sent from the controller to a control element that effects a change to the variable being manipulated. If the output signal is an air-pressure signal, the output signal will be transmitted to the control element via tubing. The control element, such as a pneumatic control valve, responds to the output signal by opening or closing, thus effecting the desired change to the variable being manipulated. The control system may include multiple valves: e.g., a two-valve system with one operating as a one-directional, open-or-shut valve and the other operating as a proportional valve. Alternatively, the output signal is converted into an electrical signal. The output signal is relayed to the control element via metal wire or other electrical conductor. The control element, such as an electronic control valve, responds to the electrical signal by opening or closing, thus effecting the desired change to the variable being manipulated.

An operator may input a value directly to the controller to produce a control signal. For example, an operator may adjust a dial or other input device on a pneumatic, hydraulic, electronic, or other controller to adjust the volumetric or mass flow rate of adhesive. The operator selects a setting on the input device of the controller corresponding to the flow rate desired by the operator. Typically the operator will have calibrated the input device on the controller so that input-device settings each correspond to specific volumetric or mass flow rate values.

A general-purpose computer may be used in place of, or in addition to, the controller mentioned above. Typically a general-purpose computer employs an input device, including, but not limited to, an alpha-numeric keyboard, mouse, joystick, stylus, touch screen, or some combination of these. Other devices which may be used to input data to the computer include, but are not limited to: devices for reading data stored on magnetic media such as 3.5 inch "floppy disks" or fixed-drives; devices for reading data stored on optical media, such as CD-ROMs; devices for reading data transmitted over cables, including optical cables; and devices for scanning and digitizing information on a document. In addition to the input devices like those mentioned above, a general-purpose computer usually includes a visual display for displaying data. Also, a general-purpose computer typically has a device for storing and retrieving data that is inputted to the computer. Devices for storing and retrieving data include, but are not limited to: a disk drive for reading data from, and storing data on, a 3.5 inch "floppy disk"; a hard disk or other fixed drive; a tape drive; or other device capable of reading data from, and storing data on, magnetic media.

A general-purpose computer may be adapted for use in controlling the volumetric or mass flow rate of adhesive. Typically a general-purpose computer comprises devices for data input, data storage, data processing, data display, and data output, as discussed above. For purposes of controlling volumetric or mass flow rate, the general-purpose computer may further comprise a set of instructions comprising the following steps: reading the control signal $M_1$, the control signal $M_1$ being transmitted to the computer in computer-readable form; correlating the control signal $M_1$ to an output signal $R_1$ and transmitting the output signal $R_1$ to a control element. The control element, such as an electronic, hydraulic, pneumatic, or other control valve, responds to the output signal $R_1$ by opening or closing, thus effecting the desired change to the variable being manipulated, in this volumetric or mass flow rate. Alternatively, the control element may effect desired changes to the speed at which a positive-displacement or other metering pump operates, thereby effecting desired changes to mass or volumetric flow rates.

The above discussion provides exemplars of equipment and methods for controlling the amount of adhesive being conducted to a point of application per unit time. It should be understood that other equipment and methods used to force adjust the flow rate of an adhesive of the present invention to a control set point, operator-inputted value, or other desired value falls within the scope of the present invention.

Tests/Procedures

Laminate Production

Figure 6:
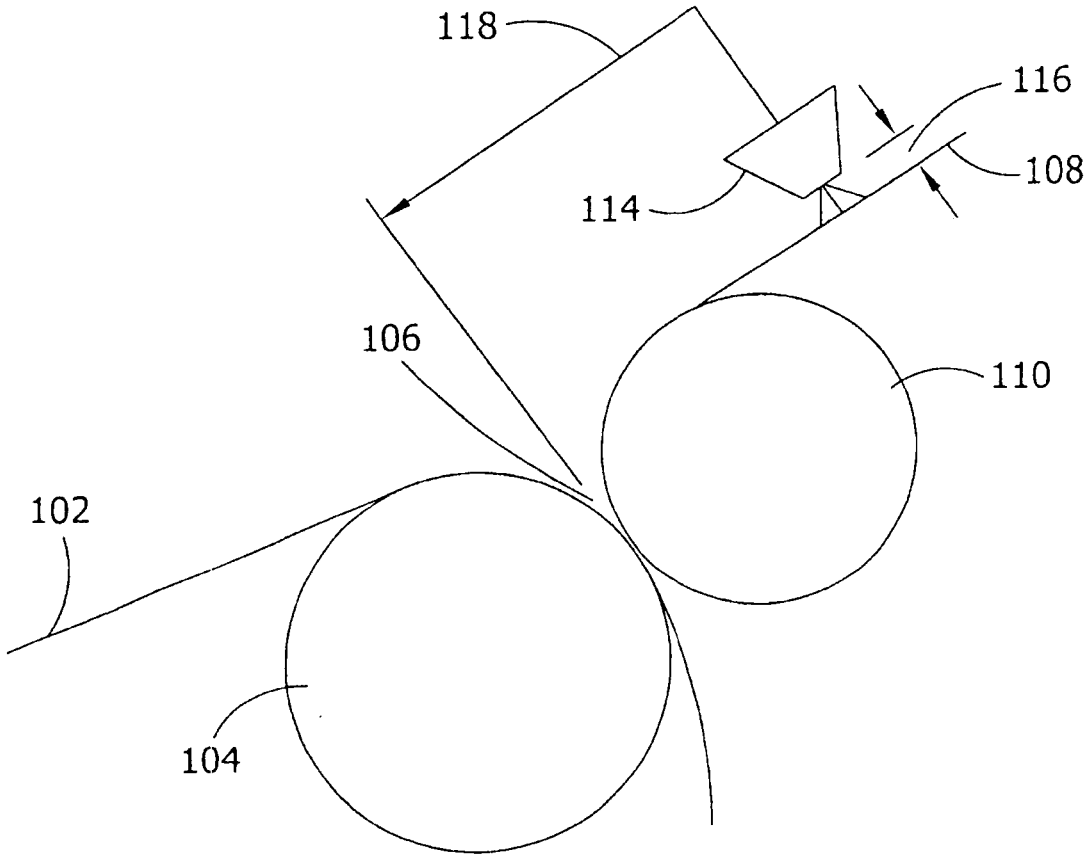
FIG. 6 shows one version of a process for making a laminate comprising an adhesive composition.

Laminates were made on equipment available from J & M Laboratories, a business having offices located in Dawsonville, Ga. As depicted in FIG. 6, a first substrate or first base material 102, such as a nonwoven web, was directed from its corresponding unwind stand (not shown) to the surface of a 6-inch-diameter steel roll 104 and through a nip 106 between the steel roll and a 4-inch-diameter rubber roll 110. A second substrate or second base material, such as a second nonwoven web 108, was directed from its unwind stand (not shown) to the surface of the rubber roll and through the nip. Typically, the equipment was operated at a speed of 300 feet per minute.

The applicator 114 used to deposit the adhesive was positioned so that the face of the depicted nozzle, which was roughly parallel to the surface of the web to which adhesive was first applied, was 1.5 inches 116 from the surface of the web. Furthermore, the central axis of the depicted nozzle, which is perpendicular to the web to which adhesive is first applied, was 8 inches 118 from a parallel axis that passes through the nip defined by the rubber and steel rolls.

Figure 7A:
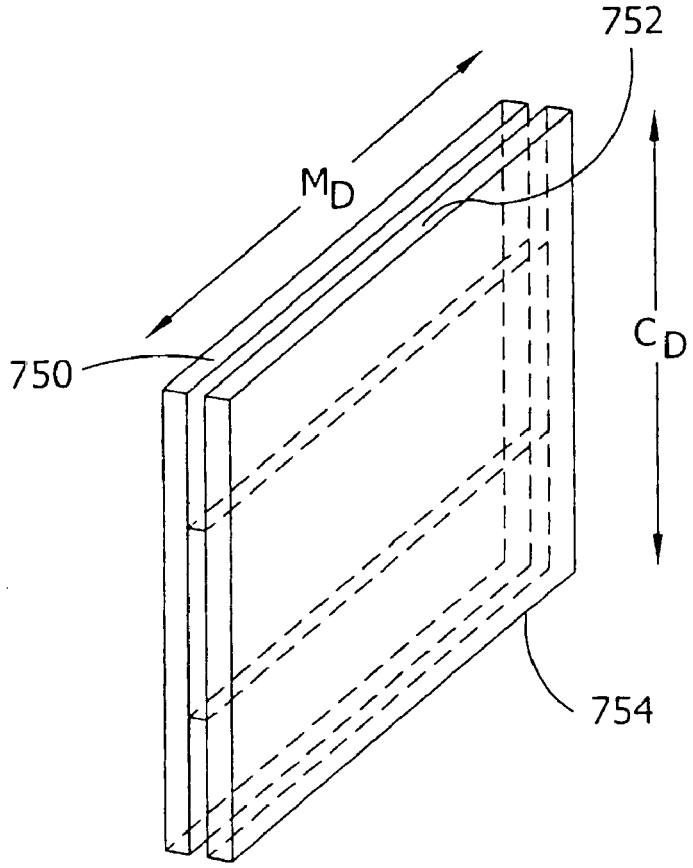
FIG. 7A shows a top view of a portion of one version of a laminate.

From the discussion above, it should be understood that the substrates and the resulting laminate 700 generally moved in a machine direction 702 (see FIG. 7A) during their preparation. FIG. 7A depicts a top view of a portion of a laminate after it has been formed. A continuous band of adhesive 703, whether it was applied using meltblowing, cycloidal, slot, or other application technique, is denoted by broken lines 705 and 707. The adhesive is under the upper substrate of the laminate depicted in the Figure. As the laminate is made a continuous manner, it is wound up in the form of a roll. The direction that is perpendicular to the machine direction, by lying within the plane of the laminate, is denoted as the cross-machine direction 704. Typically the width of the formed laminate, width denoting the dimension parallel to the cross-machine direction, was about 4 inches 706. The width of the applied adhesive, again width denoting a dimension parallel to the cross-machine direction, typically was from about 0.5 inches to about 1 inch 708. Also, the band of adhesive was generally applied such that it was substantially centered in the laminate (in the width dimension). Unless otherwise noted, the width of the applied adhesive was about 0.5 inches. (Note: the lines 710 and 712 denote the manner in which a 2-inch 714 sample was cut for subsequent analysis; sample preparation and orientation is discussed in more detail below).

The selected adhesive was either an adhesive of the present invention (as noted in the Examples below), or a hot-melt adhesive (again as noted in the Examples below). The adhesive was added using a variety of patterns, including a meltblown pattern, a swirl or cycloidal pattern, or a pattern resulting from slot coating. Typically the adhesives were heated to temperatures ranging from about 350 degrees Fahrenheit to about 380 degrees Fahrenheit prior to application to one of the substrates. Unless otherwise noted, the selected adhesive was added using a meltblown pattern. As stated above, unless otherwise noted the width of the added adhesive was about 1.0 inch. The selected adhesive was added in amounts varying from about 5 grams per square meter to about 30 grams per square meter, with specific application levels or add-on levels noted in the examples.

A number of different substrates were used to prepare the laminates, as noted in the Examples below. The substrates that were used included: a necked-bonded laminate ("NBL"), which generally comprised a polyethylene layer sandwiched between two polypropylene, spunbonded layers; a polypropylene, spunbonded layer ("SB"); and an outercover ("OC") comprising a polyethylene layer and a polypropylene, spunbonded layer. For tests where the performance of a laminate of the present invention was compared to the performance of a laminate prepared using a conventional hot-melt adhesive, the same substrates were used to prepare both the laminate of the present invention and the conventional laminate.

180° Static Peel Test

Figure 7B:
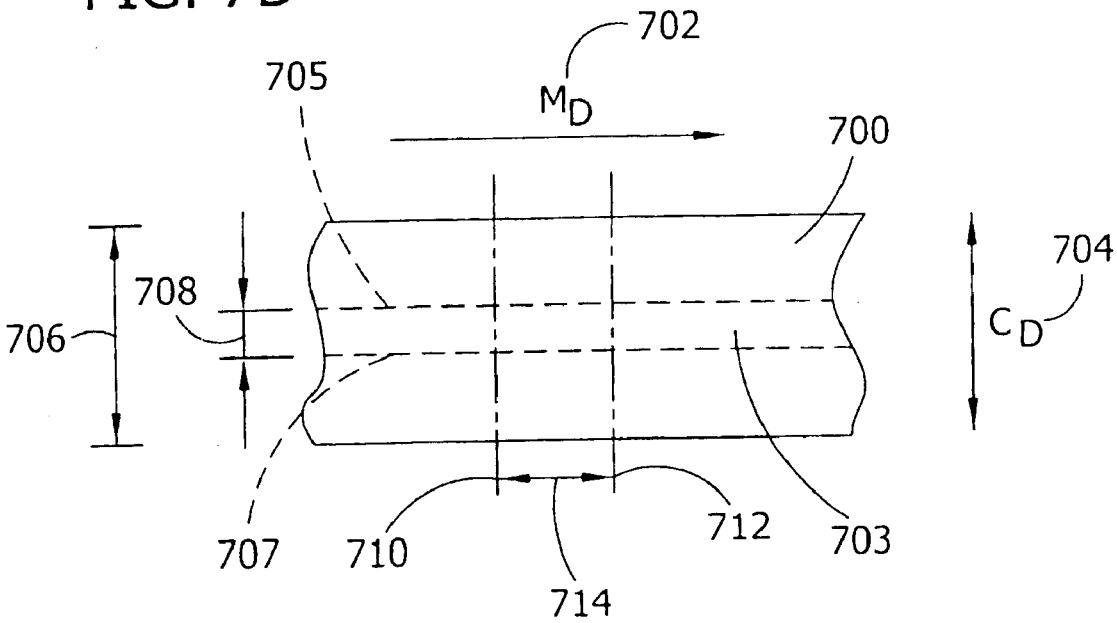
FIG. 7B shows a sectional, perspective view of a test panel cut from one version of a laminate.

The 180° static peel test was used to determine the approximate time to failure of a laminate in which one substrate was adhesively bonded to another substrate. All laminates were made as described above on a J & M machine. Samples were cut from the prepared laminate which, was in the form of a continuous web prepared on a J & M machine, as shown in FIG. 7A. FIG. 7B depicts a sectional view of a sample that has been removed from the laminate depicted in FIG. 7A. The test procedure was conducted as follows: 1. A 2-inch test panel was cut from the laminate, as shown in FIGS. 7A and 7B. 2. The test laminate was then suspended vertically in a forced-air oven, model number OV-490A-2 manufactured by Blue M Co., a business having offices in Blue Island, Ill., that had been pre-heated to a temperature of 100 degrees Fahrenheit, with the top of one substrate layer 750 secured by a clamp or other mechanical securing element, the clamp or securing element having a width greater than 2 inches. 3. A 500-gram weight was then affixed to the top edge 752 of the other substrate using a clamp or other mechanical securing element. Again, the clamp or securing element used to attach the 500-gram weight was wider than 2 inches. 4. Approximately every ½ hour, the test laminate was visually examined by quickly opening the oven door. The time at which one substrate or layer had detached from the other substrate or layer was recorded. The recorded time corresponded to the approximate time of failure of the laminate. The two, now separate, substrates were then examined to determine the nature of the failure. If the substrates separated such that most of the adhesive remained on one of the substrates, then failure was deemed to be an adhesion failure (i.e., failure likely occurred at the interface between one of the substrates and the adhesive composition). If the substrates separated such that adhesive remained on both substrates, the failure was deemed to be a cohesion failure (i.e., separation likely occurred within the adhesive composition itself). If neither of these conditions arose, but instead one or both of the substrates failed (i.e., that portion of the laminate bonded by the adhesive, usually a 1.0 inch by 2 inch area of the test panel), then the failure was deemed a material failure of one or both substrates.

Dynamic Peel and Shear Testing

To determine dynamic peel strength, a laminate was tested for the maximum amount of tensile force that was needed to pull apart the layers of the laminate. Values for peel strength were obtained using a specified width of laminate (for the present application, 2 inches); clamp jaw width (for the present application, a width greater than 2 inches); and a constant rate of extension (for the present application, a rate of extension of 300 millimeters per minute). For samples having a film side, the film side of the specimen is covered with masking tape, or some other suitable material, in order to prevent the film from ripping apart during the test. The masking tape is on only one side of the laminate and so does not contribute to the peel strength of the sample. This test uses two clamps, each clamp having two jaws with each jaw having a facing in contact with the sample, to hold the material in the same plane, usually vertically. The sample size is 2 inches (10.2 cm) wide by 4 inches (20.4 cm). The jaw facing size is 0.5 inch (1.25 cm) high by at least 2 inches (10.2 cm) wide, and the constant rate of extension is 300 mm/mm. For a dynamic peel test, one clamp is attached to the top 750 of one substrate of a test panel (see FIG. 7B). The other clamp is attached to the top 752 of the other substrate of a test panel. During testing, the clamps move apart at the specified rate of extension to pull apart the laminate. The sample specimen is pulled apart at 180 degrees angle of separation between the two layers, and the peel strength reported is the maximum tensile strength, in grams per inch, recorded during the test. Each of the peel strengths reported below is an average of five to nine tests. A suitable device for determining the peel strength testing is a SINTECH 2 tester, available from the Sintech Corporation, a business having offices at 1001 Sheldon Dr., Cary, N.C. 27513; or an INSTRON Model TM, available from the Instron Corporation, a business having offices at 2500 Washington St., Canton, Mass. 02021; or the Thwing-Albert Model INTELLECTII available from the Thwing-Albert Instrument Co., a business having offices at 10960 Dutton Rd., Philadelphia, Pa. 19154.

For a dynamic shear test, the procedure is as described above except that one clamp is attached to the top 750 of one substrate of the laminate, and the other clamp is attached to the bottom 754 of the other substrate of the laminate. The shear strength reported is the maximum tensile strength, in grams per square inch, recorded during the test. Each of the shear strengths reported is an average of five to nine tests. molecular Weight (Number Average and Weight Average)

A crystalline polypropylene was sent to American Polymer Standard Corp., a business having offices in Philadelphia, Pa., for molecular-weight determinations. The number-average and/or weight-average molecular weights were determined by American Polymer using gel-permeation chromatography on a Waters Model No. 150 gel-permeation chromatograph. The determinations were made using: four, linear, Shodex GPC gel columns; poly (styrene-divinyl benzene) copolymers as standards; trichlorobenzene as the solvent, introduced to the chromatograph at a volumetric flow rate of 1.0 milliliter per minute; an operating temperature of 135 degrees Celsius; a sample-injection volume of 100 microliters; an M-150C-(64/25) detector; and a GPC PRO 3.13 IBM AT data module.

EXAMPLES

Bonding strengths, i.e., dynamic shear and peel, as well as static peel, were determined for a blend of 20% crystalline polypropylene and 80% APAO, and also for a control of 100% APAO. The APAO used was REXTAC® 2730, or RT 2730, available from Huntsman Corporation, Salt Lake City, Utah. Crystalline polypropylene, more specifically isotactic polypropylene, was obtained from Sigma-Aldrich in the form of white, spherical particles. The crystalline polypropylene was determined to have a number-average molecular weight of about 15,000 and a weight-average molecular weight of about 110,00. The procured crystalline polypropylene had a melting index of 1000 grams per ten minutes (at a temperature of 230 degrees Celsius and when subjected to a force of 2.16 kg; see ASTM D 1238, which was used for this determination, for additional detail on measuring the melting index).

A first series of control samples were prepared by adhesively bonding two layers of substrate together using 100% RT 2730 melt-blown onto one of the substrates at various concentrations prior to nipping the two substrates together with the adhesive located between the two substrates. A first series of test samples were prepared by adhesively bonding two layers of substrate together using 20% crystalline polypropylene and 80% RT 2730 melt-blown onto one of the substrates at various concentrations prior to nipping the two substrates together with the adhesive located between the two substrates. A second series of control samples were prepared by adhesively bonding two layers of substrate together using 100% RT 2730 applied in swirls on one of the substrates at various concentrations prior to nipping the two substrates together with the adhesive located between the two substrates. A second series of test samples were prepared by adhesively bonding two layers of substrate together using 20% crystalline polypropylene and 80% RT 2730 applied in swirls on one of the substrates at various concentrations prior to nipping the two substrates together with the adhesive located between the two substrates.

In each of the series of control samples and test samples, one sample included two necked-bonded laminate ("NBL") substrates with the adhesive applied at 10 grams per square meter (gsm). Each NBL layer was made up of a polyethylene layer sandwiched between two polypropylene, spunbonded layers. A second sample in each of the series of control samples and test samples included two NBL substrates with the adhesive applied at 15 gsm. A third sample in each of the series of control samples and test samples included a polypropylene, spunbonded layer ("SB") and an outercover ("OC") comprising a polyethylene layer and a polypropylene, spunbonded layer, with the adhesive applied at 2.0 gsm in the melt-blown samples and at 1.0 gsm in the swirl application samples.

Test results of the dynamic shear strength, dynamic peel strength, and static peel strength for the first series of control samples are shown in Table 1; test results for the first series of test samples are shown in Table 2; test results for the second series of control samples are shown in Table 3; and test results for the second series of test samples are shown in Table 4.

For each of the control samples and each of the test samples, the dynamic shear strength was determined as described above (i.e., one clamp was attached to the top of one substrate of the laminate, and the other clamp was attached to the bottom of the other substrate of the laminate, and the clamps were pulled apart at a constant rate of extension of 300 millimeters per minute).

For each of the control samples and each of the test samples, the dynamic peel strength was determined as described above (i.e., one clamp was attached to the top of one substrate of the laminate, and the other clamp was attached to the top of the other substrate of the laminate, and the clamps were pulled apart at a constant rate of extension of 300 millimeters per minute).

For each of the control samples and each of the test samples, the static peel strength was determined as described above (i.e., a 500 gram mass was attached to the upper edge of one of the substrates, with the test panel suspended in an oven at a temperature of 75 degrees Fahrenheit).

TABLE 1

Bonding Strength of Melt-Blown Control Adhesive (100% RT 2730)

| Add-on/ Application | Dynamic Shear ($g/in^2$) | Dynamic Peel (g/in) | Static Peel |
|---|---|---|---|
| NBL/NBL, 10 gsm | 3340 (NBL delaminated) | 740 | 5 min (Cohesion failure) |
| NBL/NBL, 15 gsm | — | 800 | 15 min (Cohesion failure) |
| OC/SB, 2.0 gsm | 850 (SB broke) | 310 | <2 min (Cohesion failure) |

TABLE 2

Bonding Strength of Melt-Blown Test Adhesive (20% Crystalline Polypropylene/80% RT 2730)

| Add-on/ Application | Dynamic Shear ($g/in^2$) | Dynamic Peel (g/in) | Static Peel |
|---|---|---|---|
| NBL/NBL, 10 gsm | 3500 (NBL delaminated) | 750 | >48 hours (NBL delaminated) |
| NBL/NBL, 15 gsm | 3470 (NBL delaminated) | 860 | >72 hours (NBL delaminated) |
| OC/SB, 2.0 gsm | 1070 (SB broke) | 350 | ~10 min (OC delaminated) |

TABLE 3

Bonding Strength of Swirled Control Adhesive (100% RT 2730)

| Add-on/ Application | Dynamic Shear ($g/in^2$) | Dynamic Peel (g/in) | Static Peel |
|---|---|---|---|
| NBL/NBL, 10 gsm | 2070 (NBL delaminated) | 380 | 1 min (Cohesion failure) |
| NBL/NBL, 15 gsm | — | 560 | 5 min (Cohesion failure & NBL delaminated) |
| OC/SB, 1.0 gsm | 790 (SB broke) | 100 | <1 min (Cohesion failure) |

TABLE 4

Bonding Strength of Swirled Test Adhesive (20% Crystalline Polypropylene/80% RT 2730)

| Add-on/ Application | Dynamic Shear ($g/in^2$) | Dynamic Peel (g/in) | Static Peel |
|---|---|---|---|
| NBL/NBL, 10 gsm | 3590 (NBL delaminated) | 870 | ~24 hours (NBL delaminated) |
| NBL/NBL, 15 gsm | — | 990 | >72 hours (NBL delaminated) |
| OC/SB, 1.0 gsm | 880 (SB broke) | 300 | ~10 min (OC delaminated) |

As can be seen by comparing Table 1 to Table 2, and Table 3 to Table 4, the bonding strength of the blend of crystalline polypropylene and RT 2730 is considerably greater than the bonding strength of the RT 2730 alone, in terms of dynamic shear strength, dynamic peel strength, and static peel strength, in each of the samples. The improved bonding strength is particularly noticeable in the swirl applications.

Another observation that is apparent from Tables 2 and 4 is that the dynamic shear bond strength in laminates bonded with the blend of crystalline polypropylene and RT 2730 is greater than the dynamic shear material strength of the substrates. More specifically, the tests resulted in either delamination of the NBL or breakage of the SB, rather than cohesion failure. Similarly, Tables 2 and 4 also show that the static peel bond strength in laminates bonded with the blend of crystalline polypropylene and RT 2730 is greater than the static peel material strength of the substrates. More specifically, the tests resulted in delamination of either the NBL or the OC, rather than cohesion failure.

The remarkable difference between bonding strength of the blend and RT 2730 alone may be attributed to forming a crystal domain of the crystalline polypropylene. The crystal domain of the crystalline polypropylene generates physical cross-linking in the matrix of the APAO. The remarkably improved performance of bonding strength of the blend in the swirl application compared to melt-blown may be due to a larger ratio of mass of blend to bonding area in the swirl application than that of melt-blown, thus resulting in more crystallization.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A pressure sensitive hot melt adhesive *composition* comprising from about 70% to about 90% amorphous polyalphaolefin and from about 10% to about 30% crystalline polypropylene having a degree of crystallinity of at least about 40%, [said] *the* amorphous polyalphaolefin comprising a butene-1 [terpolymer with ethylene and propylene] *copolymer and having a number-average molecular weight between about 5,000 and about 30,000 and a weight-average molecular weight between about 20,000 and about 60,000, the crystalline polypropylene having a number-average molecular weight between about 10,000 and about 100,000 and a weight-average molecular weight between about 20,000 and about 300,000, and wherein the adhesive composition has a melt index between about 200 and about 2000 grams per 10 minutes as determined by ASTM D 1238.*

2. The adhesive composition of claim 1, comprising between about 73% and about 87% of the amorphous polyalphaolefin, and between about 13% and about 27% of the crystalline polypropylene.

3. The adhesive composition of claim 1, comprising between about 75% and about 85% of the amorphous polyalphaolefin, and between about 15% and about 25% of the crystalline polypropylene.

4. The adhesive composition of claim 1, wherein the degree of crystallinity of the crystalline polypropylene is at least about 60%.

5. The adhesive composition of claim 1, wherein the degree of crystallinity of the crystalline polypropylene is at least about 80%.

[6. The adhesive composition of claim 1, wherein the amorphous polyalphaolefin has a number-average molecular weight between about 5,000 and about 30,000.]

7. The adhesive composition of claim 1, wherein the amorphous polyalphaolefin has a weight-average molecular weight between about [20,000] *25,000* and about [60,000] *50,000*.

[8. The adhesive composition of claim 1, wherein the crystalline polypropylene has a number-average molecular weight between about 3,000 and about 200,000.]

[9. The adhesive composition of claim 1, wherein the crystalline polypropylene has a number-average molecular weight between about 10,000 and about 100,000.]

[10. The adhesive composition of claim 1, wherein the adhesive composition has a melt index between about 200 and about 2000 grams per 10 minutes.]

11. The adhesive composition of claim 1, wherein the adhesive composition has a melt index between about 400 and about 1800 grams per 10 minutes.

12. The adhesive composition of claim 1, wherein the adhesive composition has a melt index between about 500 and about 1500 grams per 10 minutes.

13. The adhesive of claim 1 wherein the butene-1 [ter-polymer] *copolymer* comprises between about 20% and about 65% by weight butene-1*, and a balance of a comonomer selected from the group consisting of ethylene, propylene, and combinations thereof.*

14. The adhesive of claim 1 wherein the butene-1 [ter-polymer] *copolymer* comprises between about 30% and about 55% by weight butene-1*, and a balance of a comonomer selected from the group consisting of ethylene, propylene, and combinations thereof.*

15. The adhesive composition of claim 1, wherein the crystalline polypropylene comprises at least one of the group consisting of isotactic polypropylene, syndiotactic polypropylene, and combinations thereof.

*16. The adhesive composition of claim 1 wherein the crystalline polypropylene has a melt index of about 1000 grams per 10 minutes as determined by ASTM D 1238.*

*17. A pressure sensitive hot melt adhesive composition comprising from about 70% to about 90% amorphous polyalphaolefin and from about 10% to about 30% crystalline polypropylene having a degree of crystallinity of at least about 40%, the amorphous polyalphaolefin comprising a butene-1 terpolymer with ethylene and propylene and having a number-average molecular weight between about 5,000 and about 30,000 and a weight-average molecular weight between about 20,000 and about 60,000, the crystalline polypropylene having a number-average molecular weight between about 10,000 and about 100,000 and a weight-average molecular weight between about 20,000 and about 300,000, and wherein the adhesive composition has a melt index between about 200 and about 2000 grams per 10 minutes as determined by ASTM D 1238.*

*18. The adhesive composition of claim 17, comprising between about 73% and about 87% of the amorphous polyalphaolefin, and between about 13% and about 27% of the crystalline polypropylene.*

*19. The adhesive composition of claim 17, comprising between about 75% and about 85% of the amorphous polyalphaolefin, and between about 15% and about 25% of the crystalline polypropylene.*

*20. The adhesive composition of claim 17, wherein the degree of crystallinity of the crystalline polypropylene is at least about 60%.*

*21. The adhesive composition of claim 17, wherein the degree of crystallinity of the crystalline polypropylene is at least about 80%.*

*22. The adhesive composition of claim 17, wherein the amorphous polyalphaolefin has a weight-average molecular weight between about 25,000 and about 50,000.*

*23. The adhesive composition of claim 17, wherein the adhesive composition has a melt index between about 400 and about 1800 grams per 10 minutes as determined by ASTM D 1238.*

*24. The adhesive composition of claim 17, wherein the adhesive composition has a melt index between about 500 and about 1500 grams per 10 minutes as determined by ASTM D 1238.*

*25. The adhesive of claim 17 wherein the butene-1 terpolymer comprises between about 20% and about 65% by weight butene-1.*

*26. The adhesive of claim 17 wherein the butene-1 terpolymer comprises between about 30% and about 55% by weight butene-1.*

*27. The adhesive composition of claim 17, wherein the crystalline polypropylene comprises at least one of the group consisting of isotactic polypropylene, syndiotactic polypropylene, and combinations thereof.*

*28. The adhesive composition of claim 17 wherein the crystalline polypropylene has a melt index of about 1000 grams per 10 minutes as determined by ASTM D 1238.*

* * * * *